Aug. 19, 1969     M. G. BECK     3,461,816
ELASTOMERIC RAILWAY FREIGHT CAR TRUCK BOLSTER SPRING
Filed Feb. 28, 1967     2 Sheets-Sheet 1

INVENTOR

Merrill G. Beck

BY Ralph Hammar

ATTORNEY

United States Patent Office 3,461,816
Patented Aug. 19, 1969

3,461,816
ELASTOMERIC RAILWAY FREIGHT CAR TRUCK BOLSTER SPRING
Merrill G. Beck, Erie, Pa., assignor to Lord Corporation, Erie, Pa., a corporation of Pennsylvania
Filed Feb. 28, 1967, Ser. No. 619,462
Int. Cl. B61f 5/08, 5/04; F16f 1/36
U.S. Cl. 105—197                                             8 Claims

ABSTRACT OF THE DISCLOSURE

Each spring group of coil springs in a railway truck is replaced by a single body of elastomer with upper and lower ends respectively in load transmitting relation between the bolster and the side frame. Under load, the elastomer at the ends bulges outwardly to increase the load transmitting area and to prevent stress concentration in the elastomer. One advantage is a substantially constant ride from light to full load.

---

This invention is intended to improve the ride of railway freight trucks by elastomeric compression springs having substantially constant vibration isolation for all loads. In a preferred form, a single elastomeric spring replaces each conventional spring group of coil springs. The elastomeric spring comprises a body of elastomer with the outer surface of each end converging toward a load receiving section of half or less than half the cross sectional area of the central section of the body. The outer surfaces of the body make a generally acute angle with load transmitting sections on the bolster and side frame and under load, the elastomer bulges outwardly and rolls down into contact with the load transmitting sections, increasing the load receiving area and preventing localized stress concentration in the elastomer. With this construction, the compression of the elastomer under static load can range from 35% to 60% as compared with a limit of substantially 15% to 20% for conventional elastomeric compression springs.

Figure 2:
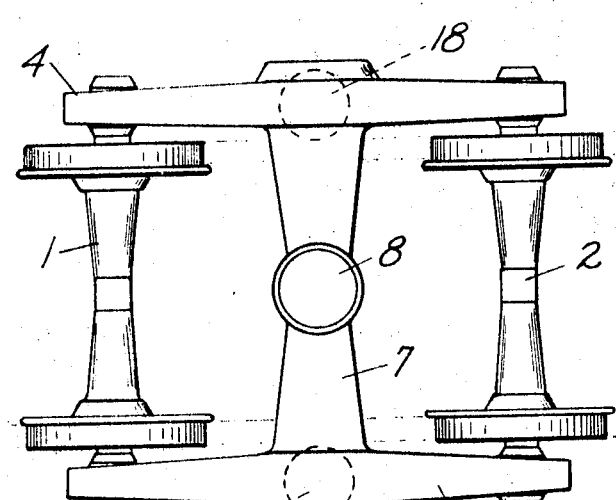
FIG. 2 is a top plan view of the truck.

In the drawing, 1 and 2 indicate the axles, 3 and 4 the side frames, each having pedestals 5 for the axle bearings 6 and 7 indicates the bolster or car weight transmitting means having at its center a center plate bearing 8 carrying the weight of the car and its load. Opposite ends 9 of the bolster extend through windows 10 in the side frame and are guided by vertical guides 11 at opposite sides of the window. At the bottom of the window is a spring seat 12 and directly above the spring seat 12 is a spring seat 13 on the under side of each end 9 of the bolster. Heretofore it has been customary to have spring groups of coil springs arranged between the spring seats 12 and 13. The most common AAR standard coil are 2½" and 3⁷⁄₁₆", numbers which refer to the deflection from free height to solid height. The coil springs come in two standard diameters 5½" diameter outside 3⅜" ID for the outer coil and 3¼" OD, 1¹⁵⁄₁₆" ID for the inner coils. The various load ratings are made up by various combinations of inner and outer coils. For example, the 70 ton car would use seven outer coils and five inner coils in the 3⁷⁄₁₆" size or seven outers and two inners in the 2½" size for each side frame. The springs in one side frame are called a spring group. Four spring groups make up a car set. One car set of 3⁷⁄₁₆" springs for a 70 ton car weighs about 715 pounds. It has also been customary to have friction dampers arranged between the ends of the bolsters and the side frames 3 and 4. The parts so far described are or may be of common construction and are typical of the essential elements of the freight car trucks in common use.

Figure 5:
FIG. 5 is a fragmentary diametral section through one of the spring seats and the column of elastomer bonded thereto.
Figure 1:
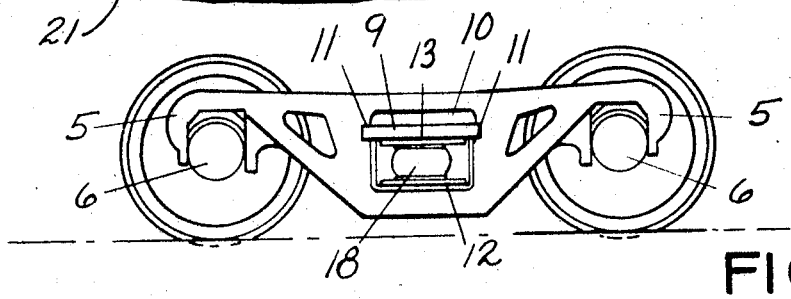
FIG. 1 is a side elevation of a railway freight truck.
Figure 3:
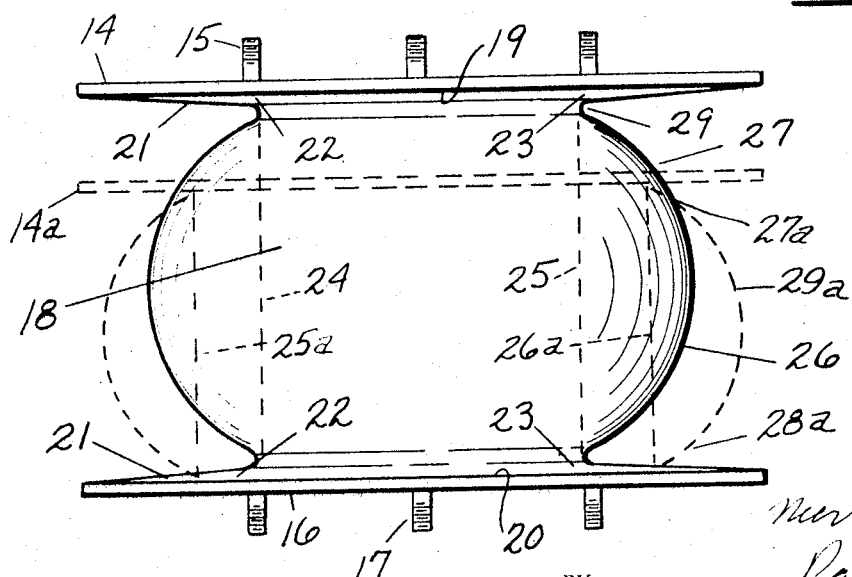
FIG. 3 is an enlarged elevation of one of the elastomeric springs.

The conventional coil spring group has a substantially linear spring rate which means that it supplies good vibration isolation at only one load with inferior isolation at larger and smaller loads. Also, the coil springs have little damping and the required friction dampers adversely affect the vibration isolation. Furthermore, the coil springs bottom under shock loads. These disadvantages are overcome by the elastomeric compression spring shown in FIG. 3. This spring has a top plate 14 provided with a plurality of upwardly extending threaded studs 15 by which it may be bolted to the spring seat 13 and a bottom plate 16 provided with a plurality of downwardly projecting threaded studs 17 by which it may be bolted to the spring seat 12. The studs 15 and 17 are merely examples of structures for locating and securing the plates 14, 16 to the associated spring seats. The plates 14, 16 become functionally part of the spring seats. Between the top and bottom plates 14, 16 is a body 18 of elastomer having upper and lower ends 19, 20 of reduced area (preferably not greater than half the maximum cross sectional area of the body 18) respectively bonded to the under and upper sides of the end plates 14, 16. Outside the ends 19, 20 there is a tapered or wedge-shaped section 21 of elastomer which is bonded to the associated end plate as shown in FIGS. 3 and 5. The sections 21 are present for convenience in manufacture and do not have a significant effect upon the performance or characteristics of the spring. The ends 19, 20 comprise the circular sections between the numerals 22 and 23. This provides in effect a solid column of elastomer between the end plates which is the effective load carrying section at light loads. Stated differently, at light loads, the load carrying section is substantially equal to a cylinder of elastomer between dotted lines 24, 25. This column of elastomer has its height substantially equal to its diameter and, therefore, is extremely stable under compression load.

Between its ends, the body 18 has an enlarged center section 26 with surfaces 27, 28 converging respectively toward the end sections 19, 20. The surfaces 27, 28 are conveniently shown as semispherical surfaces but could, obviously, be bevelled surfaces. At the junction between the surfaces 27, 28 and the tapered sections 21, there is a fillet 29. This fillet is for convenience in manufacture. Instead of the rounded fillet, a sharp corner would be functionally equivalent. The significant feature of the converging surfaces 27, 28 is that these surfaces approach the end plates 14, 16 at an acute angle so that under load, the surfaces 27, 28 in effect roll down into direct load carrying contact with the tapered sections 21 or with the end plates 14, 16 if the tapered sections 21 are omitted. The purpose of this is to protect the bond between the ends 19, 20 and the associated end plates and to prevent stress concentration which otherwise might injure the elastomer and cause premature failure.

The behavior of the elastomer under compressive load is diagrammatically illustrated in FIG. 3. When the upper end plate 14 moves to the dotted line position indicated by 14a, the fillets 29 have completely closed and the adjoining surfaces 27, 28 have moved to the positions shown by the numerals 27a and 28a. In this position there is a solid cylindrical column of elastomer between the dotted lines 25a, 26a which is significantly larger in diameter than the column of elastomer between the dotted lines 24, 25 and has significantly larger load carrying area. It will be noted that the surfaces 27, 28 have in effect rolled down upon the adjoining sections 21. There has also been a bulging of the mid section of the elastomer to the position indicated by the numeral 29a. In the dotted line position the volume of elastomer is unchanged but the shape of the elastomer has been changed to present a larger cross section of elastomer to the load and to prevent points of stress concentration which could cause premature failure.

Elastomers are virtually incompressible so that the shape of the elastomer under load maintains the volume constant. In a conventional compression mounting where the elastomer is of substantially cylindrical shape, at strains of more than 15% to 20%, points of stress concentrations result at which the elastomer tears and loses its load carrying ability. The points of stress concentration are at or near the bond between the elastomer and the end plates. In the present mounting, stress concentration adjacent the bond between the elastomer 18 and the end plates 14 and 16 is avoided by having the outer surface of the elastomer diverge from the end plates at an acute angle. By means of this end shape, before the load in the elastomer reaches values which could cause excessive localized strain, the elastomer rolls down against the end plates around the end sections 19, 20 and protects the end sections from excessive stress. By means of this end shape, the permissive strain for steady state operation is raised from a maximum of 15% to 20% to a maximum of 35% or more. That is, while conventional elastomeric compression mountings can stand operation while carrying loads which deflect the elastomer 15% to 20% of its height, the present mounting can stand operation at loads which deflect the elastomer 35% or more of its height. This allows a substantial factor of safety for long time operation while carrying loads deflecting the elastomer in the range of 35% or more of its height and at the same time allows for overloads due to intermittent shocks which cause even greater deflection.

Figure 4:
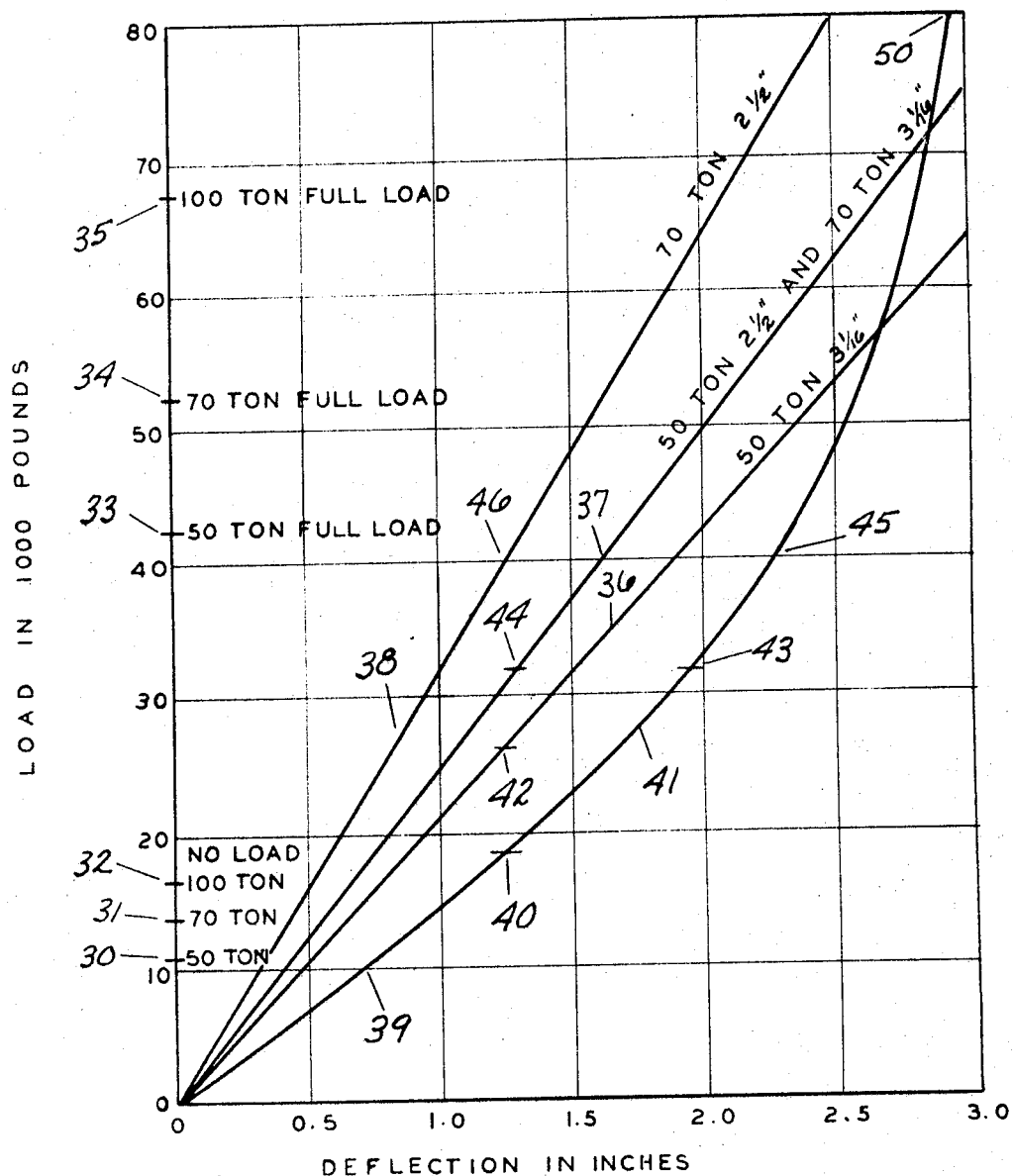
FIG. 4 is a load deflection curve.

The performance of the truck is shown in the load deflection curve of FIG. 4 which also shows the load deflection curves for typical coil spring trucks. In FIG. 4, 30, 31, 32 indicate the no load weight on each spring group for 50 ton, 70 ton and 100 ton cars respectively. The numerals 33, 34 and 35 indicate the full load weight on each spring group for 50, 70 and 100 ton cars. The weights designated by the numerals 30–35 are averages. The curve 36 is the load deflection curve for the AAR 50 ton truck with the 3⅛" spring group. The curve 37 is the load deflection curve for the 50 ton car with a 2½" spring group or for a 70 ton car with a 3⅟₁₆" group. The curve 38 is the load deflection curve for a 70 ton car with a 2½" spring group. It will be noted that the curves 36, 37, 38 are straight lines. Curve 39 is the curve for the elastomeric spring of this invention designed for a 70 ton car but also usable with 50 and 100 ton cars.

The truck of this invention has substantially the same ride or the same kind of vibration isolation at all loads from light load to extreme overload. This is due to the constantly changing spring rate of the elastomer. At point 40, which is only slightly above the light load weight for 50, 70 and 100 ton freight cars, the truck has the best or ideal vibration isolation. This same vibration isolation is obtained for all loads above point 40. This means that the truck has over its entire load carrying range, including extreme overload, the vibration isolation equal to or superior to the best vibration isolation obtainable with the standard truck at only a single load. At point 41, the vibration isolation is the same as that obtained at point 42 for a 50 ton truck with a 3⅟₁₆" spring group. At point 43, the vibration isolation is the same as that obtained at point 44 with a 50 ton truck having a 2½" spring group or with a 70 ton truck having a 3⅟₁₆" spring group. At point 45, the vibration isolation is the same as that obtained at point 46 for a 70 ton truck having a 2½" spring group. Note that with each of the AAR standard trucks there is only a single load which has optimum vibration isolation. At lower loads, the standard springs are too stiff and at higher loads the standard springs are too soft. With the truck of the present invention, the stiffness of the elastomer increases with the load so as to maintain a substantially constant vibration isolation. At light loads, the present truck has soft springs, much softer than the standard springs, while at full loads the truck has springs much stiffer than the standard springs. This result could not be obtained by a conventional elastomeric compression spring because the load deflection curve of the elastomeric compression up to loads which cause a 15% to 20% deflection spring is essentially a straight line or with a slight fall off or droop. Over this range, the elastomeric compression spring is no better or different than the coil springs presently used. Instead of the nearly linear spring rate of coil springs or of conventional elastomeric compression springs, a gradually increasing spring rate is desired.

Another disadvantage of the conventional elastomeric compression spring is that it requires a much greater height than the coil springs it is to replace. This requires redesign of the truck and prevents direct substitution. See page 401 of Davey and Payne "Rubber in Engineering Practice," published by Palmerton.

In addition to improved performance, the present truck makes substantial savings in weight. For a 70 ton freight car using 3⅛" coil springs, the weight of the springs for the car is approximately 715 pounds. For the specific truck illustrated where body 18 has a height of 8½", a maximum diameter of 14" and a diameter at reduced ends of 8⅜", the weight of the elastomer for the entire car is approximately 200 pounds. This does not take into account the weight of the end plates 14 and 16 which are adapted to fit the same spring seats used for the coil springs. The plates 14, 16 could be designed to be part of the bolster and side frame. However, even in the present design where the plates 14, 16 weigh approximately 200 pounds, there is still a weight saving of approximately 300 pounds per car. Another advantage of the present truck is that less damping is required due to the internal friction or hysteresis of the elastomer. It is not necessary that the body 18 be of circular cross section, as shown. The body could be of elongated or oval cross section to meet the space requirements of a particular truck. The end surfaces of the elongated body would approach the end plates 14 and 16 at an acute angle.

Vibration isolation depends upon the natural frequency $f$ of the supported body $m$ which varies with the spring rate $k$ of the supporting springs according to the equation $$f = \frac{1}{2\pi}\sqrt{\frac{k}{m}}$$

In order to maintain the frequency $f$ the same at all loads, the spring rate must itself be equal to a constant times the load $m$. This is obviously impossible with AAR coil springs where the spring rate is a constant. It is also impossible with conventional elastomeric compression springs which also have essentially constant spring rate over the usable load range.

The elastomeric spring of the present truck fits in the same space as an AAR standard spring group. It can be installed in old cars and is not limited to new construction. Also, its maximum deflection is within the limits for the AAR standard spring group. Coupler heights, brake mechanism, etc., are not affected. Another advantage is safety. When a coil spring breaks, it loses its load carrying ability and usually pops out of its seats. The elastomeric spring remains in place and has load carrying ability even when seriously damaged.

What is claimed as new is:

1. In a railway freight car truck having axle means, side frame means in load carrying relation to opposite ends of said axle means, car weight transmitting means extending between and having opposite ends vertically guided on said side frame means for transmitting the weight of the car, said side frame means having a plurality of upwardly presented spring seats and said car weight transmitting means having a spring seat above and downwardly presented to each upwardly presented spring seat, a column of substantially incompressible elastomer disposed in load carrying relation between the spring seats and having its axis normal to said seats, said column having ends of reduced area bonded to the associated spring seats, the outer surface of the column and the surface of the spring seat adjacent each end converging toward the axis of the column at an acute angle so that under axial compression load the outer surface of the elastomer rolls down into load carrying contact with the associated spring seat radially outside the bond between said spring seats and said ends and increases the load carrying area of the column presented to the spring seats and prevents stress concentration in the elastomer adjacent said bond.

2. The truck of claim 1 in which the area of the ends of the column is not greater than substantially half the maximum cross section of the column between the ends.

3. The truck of claim 1 in which the height of the column is not substantially greater than its maximum diameter.

4. The truck of claim 1 in which the outer surface of the column is semispherical.

5. In a railway freight car truck having axle means, side frame means in load carrying relation to opposite ends of said axle means, car weight transmitting means extending between and having opposite ends vertically guided on said side frame means for transmitting the weight of the freight car, said side frame means having a plurality of upwardly presented spring seats and said car weight transmitting means having a spring seat above and downwardly presented to each upwardly presented spring seat, spring means in load carrying relation between said spring seats and having a spring rate between empty and full car load substantially equal to a constant times the load applied to said car weight transmitting means, said spring means comprising a column of substantially incompressible elastomer, said column having ends of reduced area bonded to the associated spring seats, the outer surface of the column and the surface of the spring seat adjacent each end converging toward the axis of the column at an acute angle so that under axial compression load the outer surface of the elastomer rolls down into load carrying contact with the associated spring seat radially outside the bond between said spring seats and said ends and increases the load carrying area of the column presented to the spring seats and prevents stress concentration in the elastomer adjacent said bond.

6. The truck of claim 5 in which the area of the ends of the column is not greater than substantially half the maximum cross section of the column between the ends.

7. The truck of claim 5 in which the height of the column is not substantially greater than its maximum diameter.

8. The truck of claim 5 in which the outer surface of the column is semispherical.

References Cited

UNITED STATES PATENTS

| | | | |
|---|---|---|---|
| 139,862 | 6/1873 | Bridges | 267—3 |
| 1,484,954 | 2/1929 | Masury | 180—22 |
| 2,723,628 | 11/1955 | Rossell | 105—197 |
| 2,747,519 | 5/1956 | Heater et al. | 105—197 |
| 2,754,768 | 7/1956 | Hile | 105—197 |

ARTHUR L. LA POINT, Primary Examiner

HOWARD BELTRAN, Assistant Examiner

U.S. Cl. X.R.

267—3, 63